(12) United States Patent
Dal Pra et al.

(10) Patent No.: US 7,905,158 B2
(45) Date of Patent: Mar. 15, 2011

(54) ACTUATION DEVICE FOR A CONTROL CABLE FOR A BICYCLE GEARSHIFT, WITH ROTATABLE SUPPORT OF THE CABLE-WINDING BOBBIN

(75) Inventors: Giuseppe Dal Pra, Zane (IT); Andrea De Pretto, Piovene Rocchette (IT)

(73) Assignee: Campagnolo S.r.L., Vicenza (IT)

( * ) Notice: Subject to any disclaimer, the term of this patent is extended or adjusted under 35 U.S.C. 154(b) by 841 days.

(21) Appl. No.: 11/212,090

(22) Filed: Aug. 25, 2005

(65) Prior Publication Data

US 2006/0053941 A1     Mar. 16, 2006

(30) Foreign Application Priority Data

Aug. 31, 2004  (EP) .................................... 04425651

(51) Int. Cl.
- F16C 1/10      (2006.01)
- G05G 11/00   (2006.01)
- G05G 13/00   (2006.01)
- B62K 25/02   (2006.01)

(52) U.S. Cl. ...................... 74/489; 74/473.14; 74/502.2
(58) Field of Classification Search ................. 74/502.2, 74/488, 489, 473.14; 474/80; B62M 25/04
See application file for complete search history.

(56) References Cited

U.S. PATENT DOCUMENTS

| | | | |
|---|---|---|---|
| 5,009,629 A * | 4/1991 | Tagawa ............................ | 474/80 |
| 5,203,213 A | 4/1993 | Nagano | |
| 5,213,005 A | 5/1993 | Nagano | |
| 5,458,018 A | 10/1995 | Kawakami | |
| 5,564,310 A | 10/1996 | Kishimoto | |
| 5,617,761 A | 4/1997 | Kawakami | |
| 5,701,786 A | 12/1997 | Kawakami | |
| 5,730,030 A | 3/1998 | Masui | |
| 5,732,593 A | 3/1998 | Hwang et al. | |
| 5,768,945 A | 6/1998 | Ose | |
| 5,791,195 A | 8/1998 | Campagnolo | |
| 5,829,313 A | 11/1998 | Shahana | |
| 5,832,782 A | 11/1998 | Kawakami | |
| 5,941,125 A | 8/1999 | Watarai et al. | |
| 6,220,111 B1 | 4/2001 | Chen | |
| 6,502,477 B1 | 1/2003 | Assel | |
| 6,694,840 B2 | 2/2004 | Kawakami | |
| 2006/0213311 A1* | 9/2006 | Ose .............................. | 74/502.2 |
| 2007/0068312 A1* | 3/2007 | Sato ............................. | 74/502.2 |

FOREIGN PATENT DOCUMENTS

EP          1564131          8/2005

OTHER PUBLICATIONS

Merriam-Webster's Collegiate Dictionary, 10th Ed., 1999, p. 975.*

* cited by examiner

*Primary Examiner* — Vinh T. Luong
(74) *Attorney, Agent, or Firm* — Volpe and Koenig P.C.

(57) ABSTRACT

The described actuation device comprises a housing, intended for attachment to the handlebars or to the frame of a bicycle, a cable-winding bobbin, angularly mobile in the housing about a main axis (X) of the device, and support means of the bobbin in the housing. Such support means comprise a first support unit at an outer guide collar of the cable-winding bobbin, situated in an intermediate position of the bobbin in the direction of the main axis (X) of the device. An excellent distribution of the stresses between the bobbin and the housing is thus ensured, substantially reducing the risks of excessive deformation and breaking.

17 Claims, 8 Drawing Sheets

ACTUATION DEVICE FOR A CONTROL CABLE FOR A BICYCLE GEARSHIFT, WITH ROTATABLE SUPPORT OF THE CABLE-WINDING BOBBIN

FIELD OF THE INVENTION

The present invention concerns an actuation device for a control cable for a bicycle gearshift. The following description is made with reference to specially configured devices for bicycles with straight handlebars (typical of mountain bikes), but the invention is clearly independent from the shape of the handlebars and the consequent configuration of the actuation device; therefore, the invention can also be used in devices for racing cycles, with curved handlebars.

BACKGROUND

A bicycle is normally provided with two gearshifts, a front gearshift associated with the crankset and a rear gearshift associated with the sprocket set. In both cases, the gearshift comprises a derailleur that engages the transmission chain moving it on toothed wheel with different diameters and number of teeth, so as to obtain different transmission ratios; the derailleur, be it that of the rear gearshift or that of the front gearshift, is moved in one direction by a traction action applied by an inextensible cable that is usually sheathed (normally known as a Bowden cable), in the opposite direction by the elastic return action of a spring provided in the gearshift itself. Normally, the direction in which the displacement is determined by the return spring is that in which the chain passes from a toothed wheel with a larger diameter to a toothed wheel with a smaller diameter, i.e. that of so-called downward gearshifting; vice-versa, the traction action of the control cable takes place in the direction of so-called upward gearshifting, wherein the chain moves from a toothed wheel with a smaller diameter to a toothed wheel with a larger diameter. It should be noted that in a front gearshift downward gearshifting corresponds to a lower transmission ratio, whereas in a rear gearshift it corresponds to a higher transmission ratio.

The movement in the two directions of the control cable of a gearshift is obtained through an actuation device mounted so as to be easily operated by the cyclist, i.e. normally on the handlebars, close to its grips. By convention, the actuation device of the control cable of the front gearshift is adjacent the left grip and vice-versa, the actuation device of the control cable of the rear gearshift is adjacent the right grip.

In the actuation device, the control cable is actuated through winding and unwinding on a rotor element, commonly called a cable-winding bobbin, the rotation of which is controlled by the cyclist with different means according to the type of gearshift. In a typical configuration, the actuation device provides two distinct levers, to control the rotation in the two directions of the bobbin. An indexer (such as that described in the co-pending U.S. application Ser. No. 11/051, 908, hereby incorporated by reference) ensures that the bobbin is held still in rotation in a number of predetermined angular positions, corresponding to the different positions of the derailleur required by the different ratios, i.e. on the different sprockets of the gearshift.

The rotatable support of the bobbin in the body or housing of the actuation device is normally obtained thanks to the fact that the bobbin is made with a tubular structure, rotatably mounted on a support pin formed in the housing or anyway integral with it, extending substantially for the entire axial length of the bobbin or for a substantial part thereof. On the outside, the bobbin has a circumferential groove for the winding of the control cable. The pin must withstand relatively high forces, due to the action exerted in the operation by the various elements like the control cable (which is unwound under tension), the indexer and the actuation levers. Clearly, it is necessary to avoid any risk that such forces can cause breaking of the pin; even without breaking, however, an excessive deformation of the pin can lead to imperfect conditions of positioning of the bobbin, resulting in gearshifting difficulties, non-uniform wear of the components, subsequently reducing the service time of the components.

Therefore, there is the problem of making an actuation device in which the cable-winding bobbin is effectively supported, without the risk of breaking or deformation such as to compromise the good operation of the gearshift.

SUMMARY

The present invention relates to an actuation device for a control cable for a bicycle gearshift, comprising: a housing attachable to a bicycle's handlebars or frame; a cable-winding bobbin, angularly mobile within the housing about a main axis of the device by a rotatable support of the bobbin in the housing, wherein said rotatable support comprises a first support unit at an outer guide collar of the cable-winding bobbin, situated in an intermediate position of the cable-winding bobbin in the direction of the main axis of the device.

The present invention also relates to an actuation device for a bicycle gearshift control cable comprising: a housing attachable to a bicycle; a cable winding bobbin, rotatable within the housing, having first and second ends, an intermediate recess and a cable take-up portion; and a support that engages the bobbin at the recess and retains the bobbin within the housing.

BRIEF DESCRIPTION OF THE DRAWINGS

Further characteristics and advantages of the invention shall become clearer from the following description of preferred embodiments thereof, made with reference to the attached drawings. In such drawings an actuation device of the control cable of a rear gearshift (right-hand control), structurally integrated with a brake-control device and mounted on straight handlebars, is shown. It should be understood that the present invention can be used with a bicycle having straight or curved handlebars, whether the control is right or left, autonomous or integrated with the brake control, and it is also independent of the particular indexing means used. More specifically.

DETAILED DESCRIPTION OF THE PREFERRED EMBODIMENTS

Introduction to the Embodiments

Figure 1:
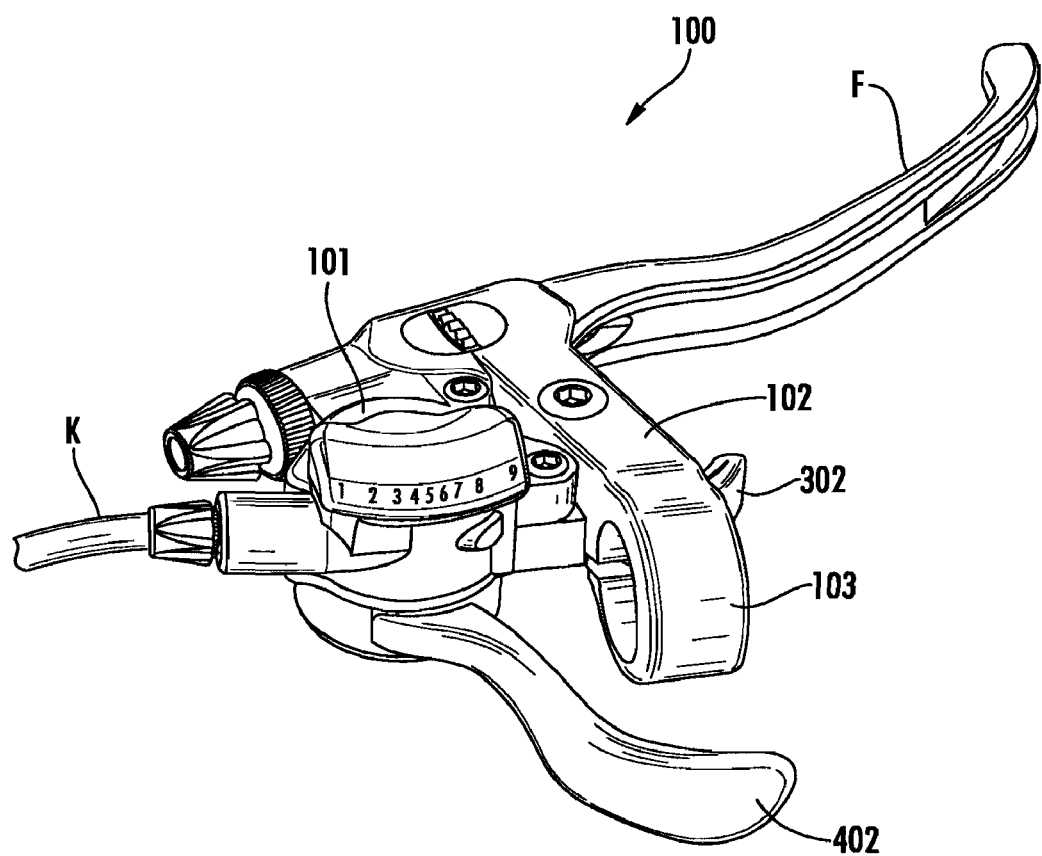
FIG. 1 is a view of an actuation device of the control cable of a gearshift, from the cyclist's viewpoint.

The present invention refers to an actuation device for a control cable for a bicycle gearshift, comprising:

a housing, intended for fastening to the handlebars or to the frame of the bicycle, a cable-winding bobbin, angularly mobile in the housing about a main axis of the device through rotatable support means of the bobbin in the housing, wherein said rotatable support means comprise a first support unit at an outer guide collar of the cable-winding bobbin, situated in an intermediate position of the cable-winding bobbin in the direction of the main axis of the device.

The presence of a rotatable support means that acts from the outside on the cable-winding bobbin at an intermediate position thereof ensures an excellent distribution of the forces between the bobbin and the housing, substantially reducing the risks of excessive deformations and breaking.

Preferably, the first support unit comprises a plate, fixed integrally to the housing and provided with a central hole in which the cable-winding bobbin is inserted and guided in rotation. This solution ensures the necessary solidity without introducing expensive constructive complications.

Between the aforementioned plate and the cable-winding bobbin it is suitable to provide means for reducing friction during the mutual rotation. Such means can simply consist of a suitable processing of the parts in contact, or a suitable selection of their materials.

Preferably, however, the first support unit comprises a first centering bushing, arranged in the hole of the plate between the plate and the outer guide collar of the cable-winding bobbin. Thus, better friction control is ensured, without imposing particular design needs for the bobbin and the plate; and can therefore be made with the most suitable material from other points of view, for example lightness and/or strength.

Preferably, the first centering bushing is divided into two half-bushings. This allows it to be easily assembled onto the collar of the cable-winding bobbin, even though such a collar is in an intermediate position on the bobbin.

In addition to the aforementioned first support unit, the device can have other rotatable support means of the bobbin, for example an inner pin inserted in an axial hole of the bobbin. However, thanks to the particular effectiveness of the first support unit, the other support means can be different, in particular, simpler and lighter.

According to a preferred embodiment, the rotatable support means comprise a second support unit at an end of the cable-winding bobbin. The central pin extending along the entire bobbin can thus be eliminated, thus allowing an advantageous reduction in weight to be obtained, which is particularly of interest above all in gearshifts intended for competition bicycles.

The second support unit can have different configurations.

In a first preferred embodiment, the second support unit comprises a seat formed in the housing and a tailpiece of the cable-winding bobbin, inserted and guided in rotation in said seat, with possible interposition of a centering bushing.

In a second preferred embodiment, the second support unit comprises a pin integral with the housing and a hole formed axially in the cable-winding bobbin, the pin being inserted and guided in rotation in said hole, with possible interposition of a centering bushing. In this case, it should be noted that the pin is structurally and functionally different to the pin described with reference to the prior art, since it does not extend through the entire bobbin and therefore it is unable to support the bobbin by itself.

In a third preferred embodiment, the second support unit comprises a seat formed in the housing, a hole formed axially in the cable-winding bobbin and a pin inserted integrally in the hole in the cable-winding bobbin and guided in rotation in the seat in the housing, with possible interposition of a centering bushing.

In a fourth preferred embodiment, the second support unit comprises a seat formed in the housing, a hole formed axially in the cable-winding bobbin and a pin inserted and guided in rotation in the seat formed in the housing and in the hole formed in the cable-winding bobbin, with possible interposition of centering bushings or other intermediate elements.

The device also comprises: a first operating mechanism, acting on the cable-winding bobbin to rotate it in a first angular direction; a second operating mechanism, acting on the cable-winding bobbin to rotate it in a second angular direction opposite the first; and an indexer to removably hold said cable-winding bobbin in predetermined angular positions.

Said first operating mechanism comprises a first actuation lever and said second operating mechanism comprises a second actuation lever; said first actuation lever and said second actuation lever act in rotation on said bobbin, respectively, according to the first and second angular direction; a first return spring is provided to take said first actuation lever back into rest position after its actuation and a second return spring is provided to take said second actuation lever back into rest position after its actuation.

Preferably, said cable-winding bobbin, said first operating mechanism, said second operating mechanism and said indexer are included in a control unit that can be separated en masse from the housing. The control unit is fixable to said housing through fastening screws.

Thus, it is possible to quickly and easily replace all of the essential parts of the device without it being necessary to dismount the device itself from the handlebars. The ease and rapidity of replacement is particularly advantageous to quickly replace a broken or defective control unit. Furthermore, the ease and rapidity of replacement is also advantageous when it is necessary to replace one control unit with another having different characteristics, necessary, for example, because one wishes or one has to replace the group of sprockets of the gearshift with one having different ratios. Both of these possibilities are certainly useful and appreciable in all circumstances, and become extremely important during the course of a competition, when it is essential to reduce the time taken for mechanical interventions to a minimum.

Description

The figures show an actuation device 100 of the control cable K of a rear gearshift. The device 100 is intended to be mounted adjacent the right grip of straight bicycle handlebars, normally used for mountain bikes, as can be seen from FIGS. 1, 3 and 4.

The device 100 comprises a housing 101, which is fixed to the handlebars in a conventional manner, for example through a support 102 with a band 103.

In the housing 101 a main axis X is defined, which is the reference axis for the elements that form part of the device 100; all of the direction indications and the like, such as "axial", "radial", "circumferential" and "diametral", shall be referred to with respect to it. About the main axis X, two opposite angular directions or directions of rotation R1 and R2 are defined.

Figure 5:
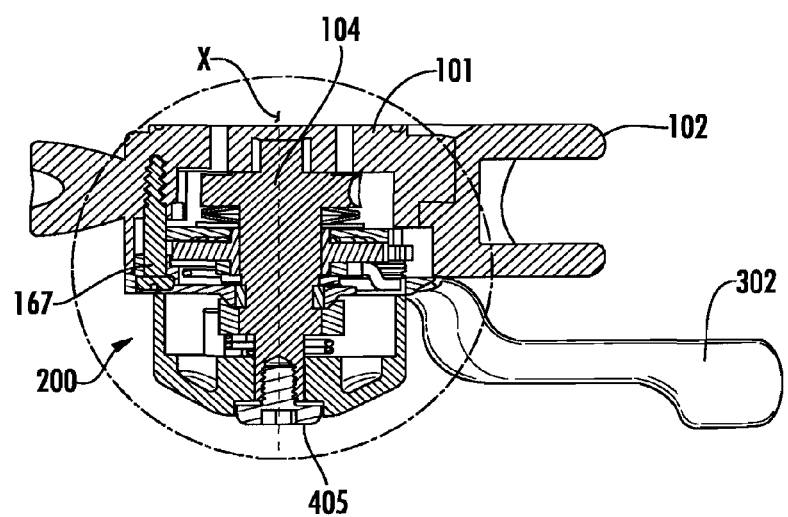
FIG. 5 is a section view of the device of FIG. 4, along line V-V of FIG. 4.

In the housing 101 a cable-winding bobbin 104 (FIG. 5) is mounted free in rotation, to which the cable K to be actuated is fixed and on which it is wound.

Figure 2:
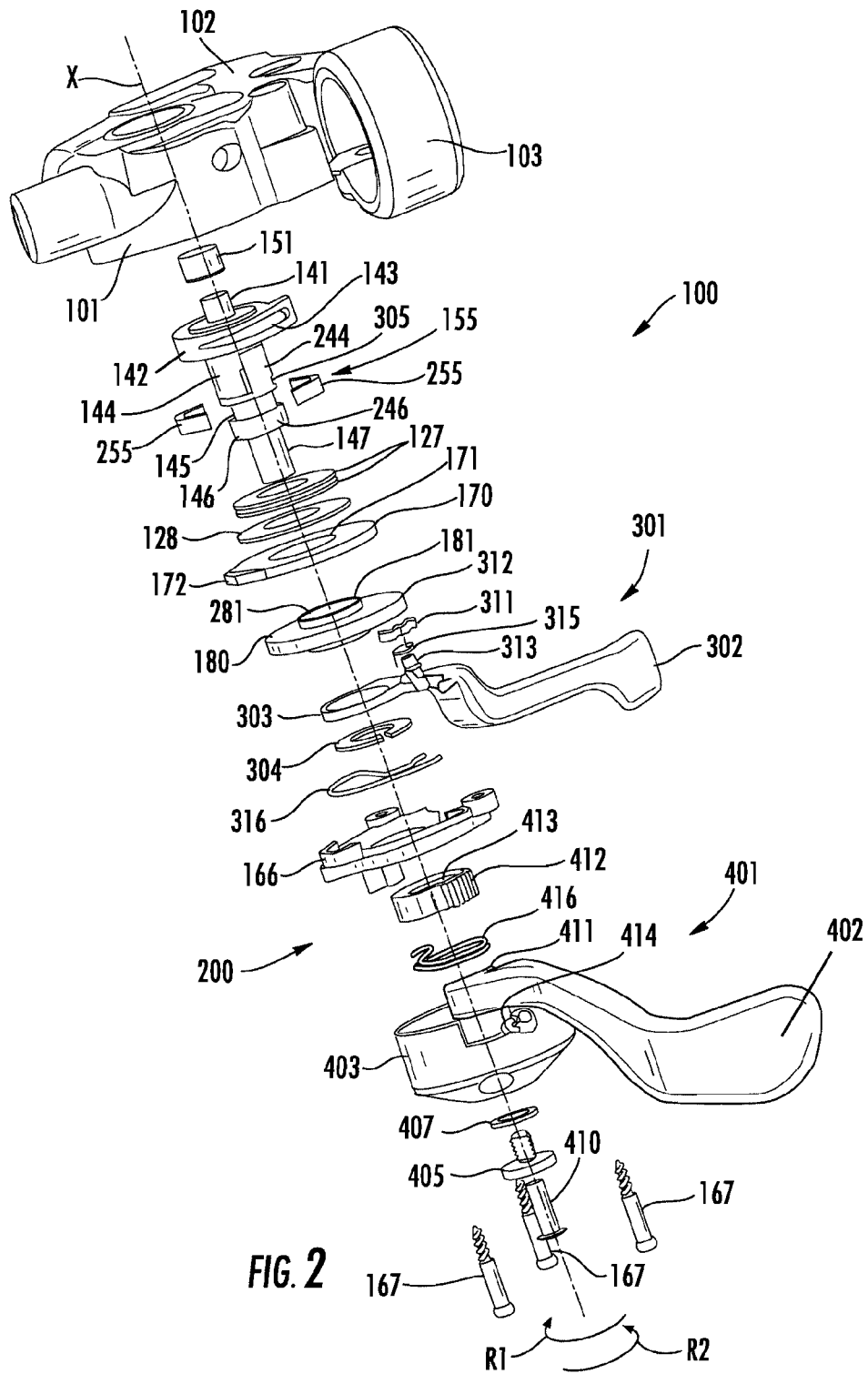
FIG. 2 is an exploded view of the device of FIG. 1.
Figure 6:
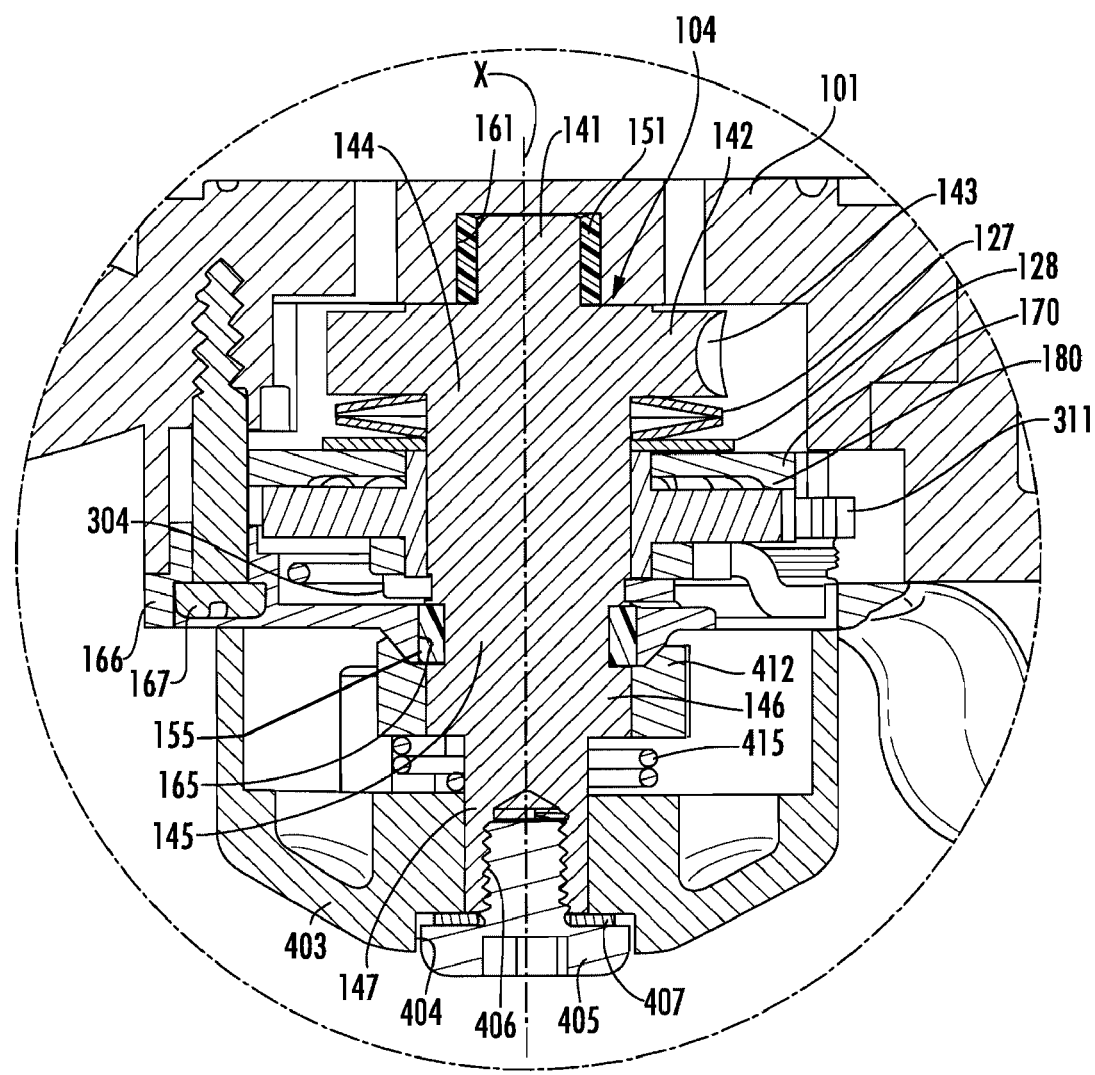
FIG. 6 is an enlarged scale representation of part of FIG. 5.

The cable-winding bobbin 104 has a full monolithic structure, with substantially axial extension in the direction of the axis X. It comprises, in succession, from its upper end according to the orientation of FIGS. 2, 5 and 6, a cylindrical end tailpiece 141, a winding disc 142 with a groove 143 for receiving the control cable K, a first asymmetric tailpiece 144, a cylindrical collar 145, a second asymmetric tailpiece 146 and a cylindrical end tailpiece 147.

On the end tailpiece 141 a first annular centering bushing 151 is fitted, which is also fitted inside a cylindrical seat 161 formed in the housing 101. On the cylindrical collar 145 a second centering bushing 155 is fitted, divided into two half-bushings 255 coupled together; the bushing 155 is also fitted inside a cylindrical hole 165 formed in a plate 166 integrally fixed to the housing 101 through three fastening screws 167. The two bushings 151 and 155 are made from a low friction material (such as e.g. Torlon® or Vespel®), so as to promote the possibility of mutual rotation between the parts to which they are fitted.

The asymmetric tailpieces 144, 146 are both generally cylindrical shaped with two leveled sides, 244 and 246 respectively, so as to be useful for fitting elements thereon that must be integral in rotation with the bobbin 104.

An indexing disc 170 is mounted on the tailpiece 144; this disc 170 is not, however, fitted integral in rotation on the tailpiece 144 and therefore with the bobbin 104, but it is, on the other hand, provided with a central hole 171 that does not interfere with the tailpiece 144. Vice-versa, the indexing disc 170 is mounted and thereby kept from rotating in the housing 101, by a radially projecting lug 172, that surrounds the stem of one of the fastening screws 167. This configuration allows the axial movements of the indexing disc 170 along the axis X. At least one spring washer 127 (in the illustrated example there are two interfacing springs 127), compressed in the axial direction, and possibly a spacer ring 128, are positioned between the indexing disc 170 and the bobbin 104.

Again, on the tailpiece 144 a ball-carrying disc 180 is also fitted integral in rotation, provided for this purpose with a central hole 181 with a shape matching the section of the tailpiece 144, i.e. generally cylindrical shaped with two flat sides 281.

The discs 170 and 180, together with the surrounding elements that cooperate with them, such as the springs 127, form an indexer for the device 100, i.e. they ensure that the cable-winding bobbin 104 is kept still in predetermined angular positions, or alternatively is moved between such positions upon the cyclist's command.

An operating mechanism 301 is also provided for downward gearshifting, with a first actuation lever 302 provided with a ring-shaped inner portion 303 rotatably fitted on the tailpiece 144 and held here in the axial direction by an elastic retaining ring 304 (commonly known as a Seger ring), inserted in a corresponding annular seat 305 formed on the tailpiece 144. The mechanism 301 is a conventional ratchet mechanism and comprises a first pawl 311, which is carried by a pin 313 mounted on the first lever 302 and engages, in operation, with a toothed sector 312 of the ball-carrying disc 180; a closing spring 315 cooperates with the pawl 311, thrusting it towards a position approaching the toothed sector 312, a position in which the pawl 311 does not engage the toothed sector 312 when the first lever 302 is in a rest position, whereas it does engage it as soon as the first lever 302 is actuated to carry out downward gearshifting through its rotation in the direction of rotation R1. Finally, a first return spring 316 is provided for the first lever 302.

Furthermore, an operating mechanism 401 is provided for upward gearshifting, with a second actuation lever 402. The mechanism 401 is also a conventional ratchet mechanism and comprises a cover 403 with an axial hole 404; the cover 403 is mounted on the bobbin 104 by means of a screw 405, inserted through the hole 404 of the cover 403 and screwed into a respective threaded hole 406 formed along the axis X in the end tailpiece 147, with interposition of an anti-friction ring 407. The cover 403 carries a pin 410 on which the second lever 402 is hinged, with which a second pawl 411 is associated that operates in engagement with a toothed bush 412, fitted integral in rotation on the tailpiece 146 of the bobbin 104, thanks to a hole 413 with a shape matching the asymmetric section of the tailpiece 146. An opening spring 414 is also provided that cooperates with the second lever 402 and with the pawl 411, and a second return spring 416 for the second lever 402. The pawl 411 engages the toothed bush 412 when the second lever 402 is actuated to carry out upward gearshifting in the direction of rotation R2, whereas it is disengaged from such a toothed bush 412 when the second lever 402 is in rest position.

Figure 3:
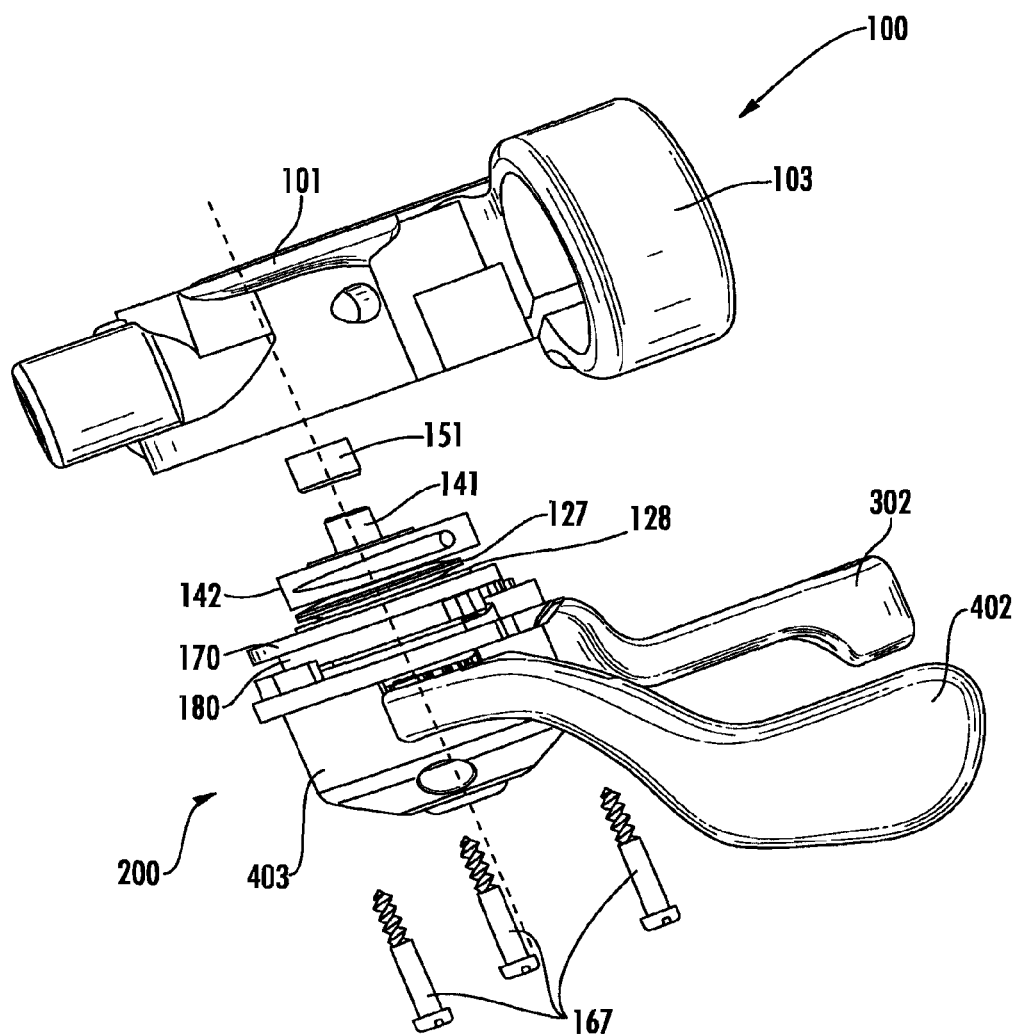
FIG. 3 is a view of the device of FIG. 1 partially assembled.
Figure 4:
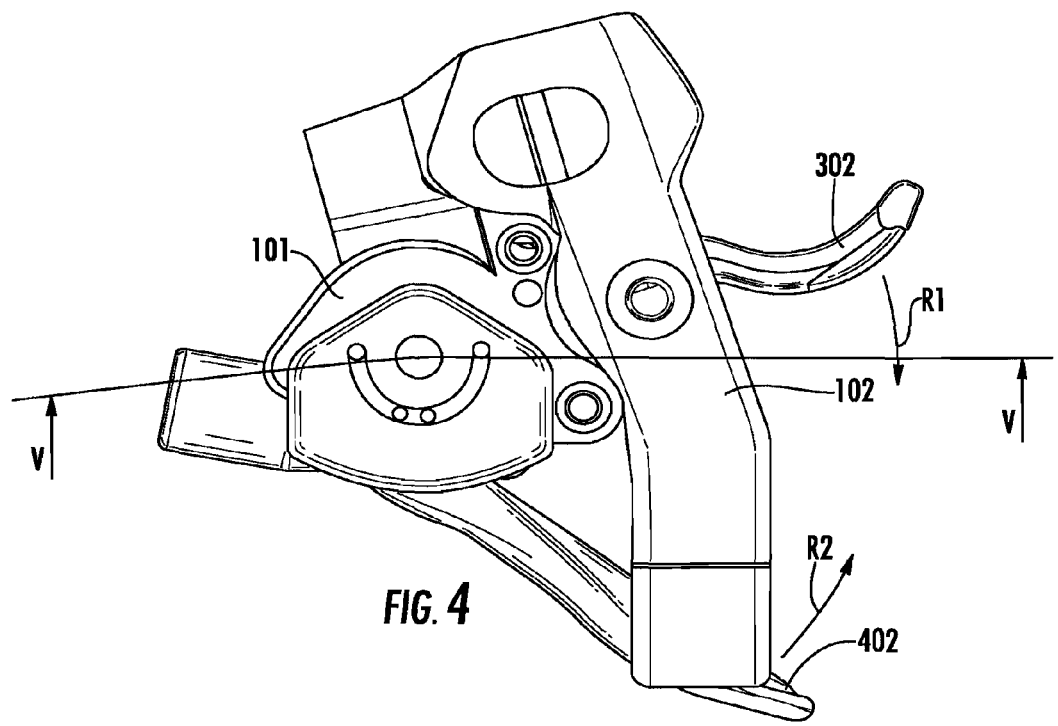
FIG. 4 is a top plan view of the device of FIG. 1.

The cover 403 does not prevent access to the fastening screws 167, so that the group of operative elements of the actuation device, wholly referred to as the control unit and indicated by reference numeral 200, is separable en masse from the housing 101, as shown by FIG. 3.

On the cable-winding bobbin 104, the two bushings 151 and 155 are spaced apart in the axial direction. The distance in the axial direction between the bushings 151 and 155 is at least equal to 50% of the length in the axial direction of the cable-winding bobbin 104 and at least equal to 80%—preferably 100%—of the minimum winding diameter of the control cable K on the cable-winding bobbin 104, i.e. of the inner diameter of the circumferential groove 143 for receiving the control cable K.

In operation, thanks to the meshing of the pawls 311 and 411 respectively with the toothed sector 312 and the toothed bush 412, the action of the lever 302 in direction R1 determines a rotation of the cable-winding bobbin 104 in angular direction R1, whereas the action of the lever 402 in direction R2 determines a rotation of the cable-winding bobbin 104 in angular direction R2.

The bushings 151 and 155 withstand and transmit the stresses between the cable-winding bobbin 104 and the housing 101 of the actuation device 100. Since such bushings 151 and 155 are significantly spaced apart, they are able to effectively counteract, even very unbalanced, stresses without significant deformations, and especially without breaking, occurring in the device 100 for this reason.

Figure 7:
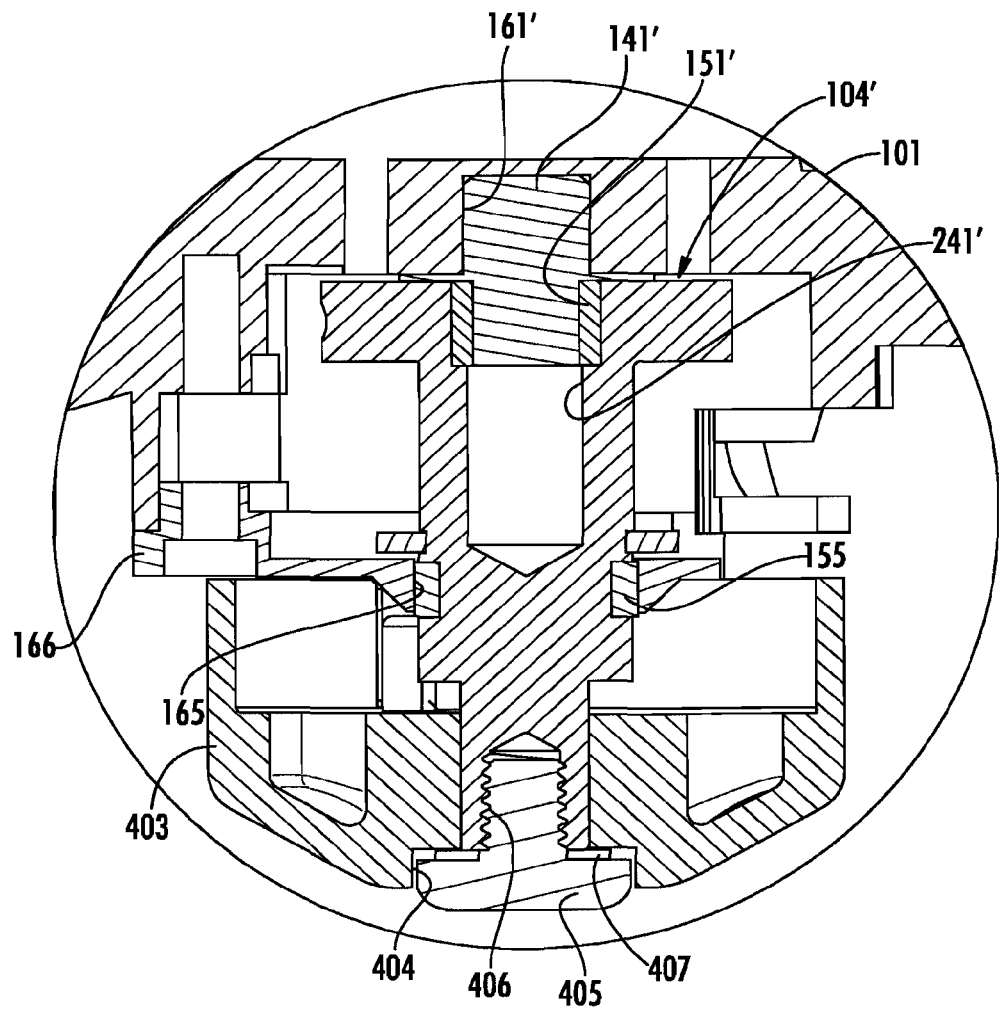
FIGS. 7, 8 and 9 are section views, similar to FIG. 6, of alternate embodiments of the invention.
Figure 8:
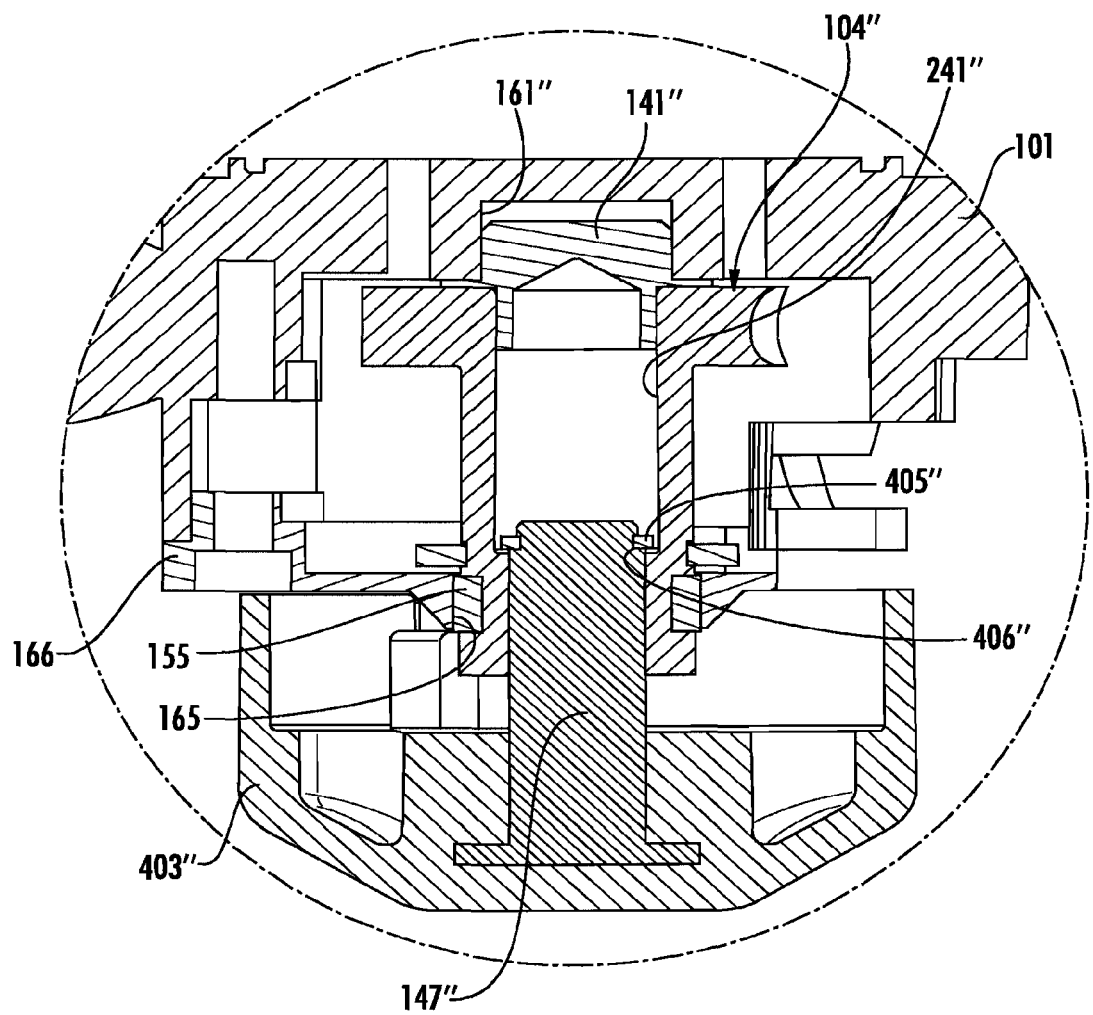
Figure 9:
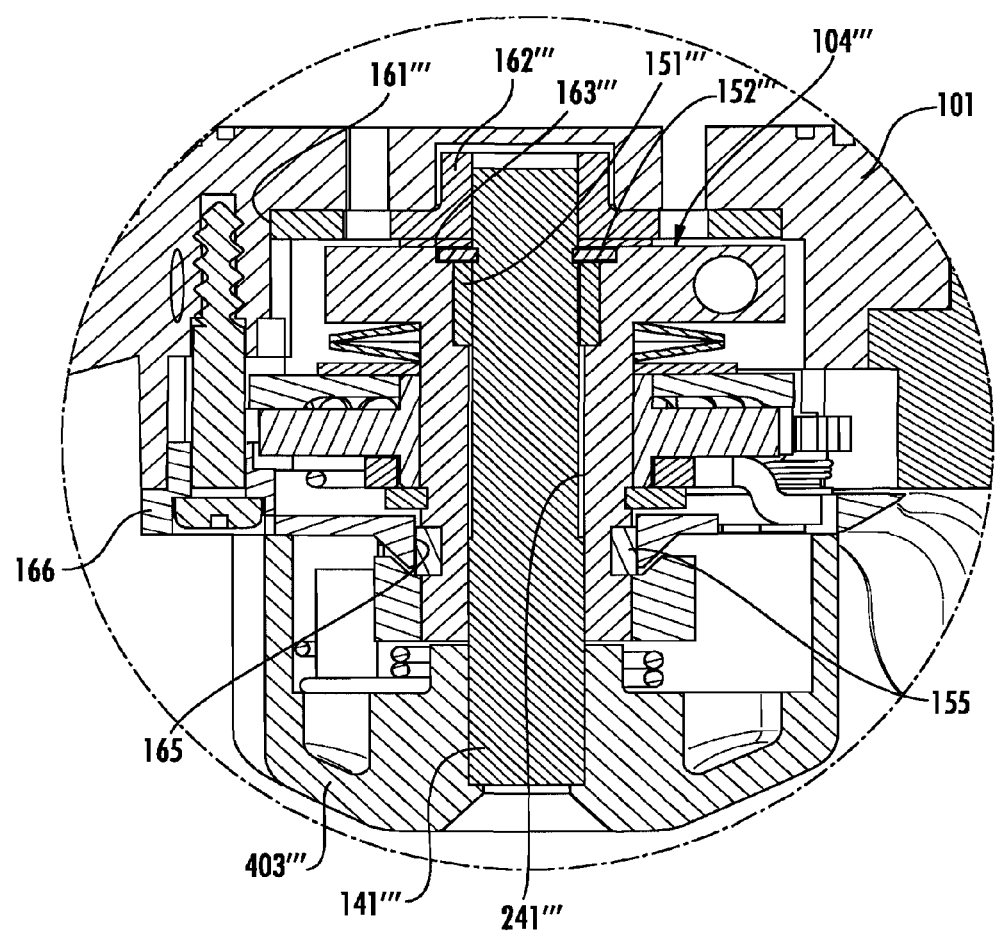

FIGS. 7, 8 and 9, as stated, show further embodiments of the present invention. For the sake of clarity and ease of explanation, the indexer is not represented in FIGS. 7 and 8, whereas it is only schematically represented in FIG. 9. Moreover, details that are substantially the same are indicated by the same reference numerals, whereas functionally analogous but different details are indicated by the same reference numerals with the addition of an apostrophe (') for the second embodiment, two apostrophes (") for the third embodiment and three apostrophes ("') for the fourth embodiment.

In the second embodiment, shown in FIG. 7, the cable-winding bobbin, indicated with 104', lacks the first tailpiece. At such an upper end (with reference to the orientation of FIG. 7), the rotatable support of the bobbin 104' is ensured by a pin 141', mounted fixed in a seat 161' formed in the housing 101 and inserted in an axial hole 241' formed in the bobbin 104', with interposition of a bushing 151'; the bushing 151' is thus fitted on the pin 141' and in the hole 241'.

This embodiment is lighter, thanks to the hole 241', which implies a reduction in material of the bobbin 104'.

In the third embodiment, shown in FIG. 8, the cable-winding bobbin 104" lacks both the first and second tailpiece. At the upper end (with reference to the orientation of FIG. 8), the rotatable support of the bobbin 104" is ensured by a pin 141", mounted in a seat 161" formed in the housing 101 and inserted in an axial hole 241" formed in the bobbin 104"; the pin 141" can be fixed in the seat 161" and be rotatably fitted in the hole 241", or else vice-versa can be fixed in the hole 241" and be rotatably fitted in the seat 161", or furthermore be rotatably fitted both in the hole 241" and in the seat 161". At the lower end, the cover 403" is fixed to the bobbin 104" through a shank 147", fixed to the cover 403" in the molding step thereof and anchored to the bobbin 104" through an elastic ring 405", inserted in a respective groove 406" formed on the shank 147". It should be noted that the second rotatable support point remains defined by the bushing 155, between the bobbin 104" and the plate 166.

This embodiment is also lighter, thanks to the hole 241", which implies a reduction in material of the bobbin 104".

In the fourth embodiment, shown in FIG. 9, the cable-winding bobbin 104''' once again lacks both the first and second tailpiece, and is axially crossed by a through hole 241'''. In the hole 241''' a pin 141''' is inserted and guided in rotation, which crosses the bobbin 104''' in its entire axial extension, projecting from it at both ends. At the upper end (with reference to the orientation of FIG. 9), the pin 141''' is mounted in a seat 161''' formed in the housing 101 with interposition of a flange 162'''. Between the flange 162''' and the end of the bobbin 104''' an anti-friction ring 163''' is arranged in the axial direction, mounted around the pin 141'''.

The pin 141''' is rotatably mounted in the hole 241''' with interposition—at the upper end of the cable-winding bobbin 104'''—of a centering bushing 151''', held in the axial direction on the pin 141''' by an elastic retaining ring 152''' (commonly known as a Seger ring).

At the lower end, the pin 141''' is fixed integral in rotation to a cover 403''', which carries the operating mechanism 401; advantageously, the pin 141''' is fixed to the cover 403''' in its molding step. It should be noted that the second rotatable support point remains defined by the bushing 155, between the bobbin 104''' and the plate 166.

This embodiment is particularly simple from the constructive point of view, and therefore is economically advantageous, whilst still ensuring the desired mechanical characteristics of resistance to deformation and breaking.

What is claimed is:

1. An actuation device for a control cable for a bicycle gearshift, comprising:
    a housing, configured to be attached to a bicycle's handlebars or frame,
    a cable-winding bobbin, angularly mobile within the housing about a main axis (X) of the device by a support of the bobbin in the housing,
    wherein said support comprises a first support unit at an outer guide collar of the cable-winding bobbin, situated in an intermediate position of the cable-winding bobbin in the direction of the main axis (X) of the device; and
    wherein the first support unit comprises:
        a plate, fixed integrally to the housing and provided with a central hole in which the cable-winding bobbin is inserted and guided during rotation; and
        a centering bushing, which comprises two half-bushings, arranged in the hole of the plate between the plate and the outer guide collar of the cable-winding bobbin.

2. The device according to claim 1, wherein the support further comprises a second support unit at an end of the cable-winding bobbin.

3. The device according to claim 2, wherein the second support unit comprises a seat formed within the housing and a tailpiece of the cable-winding bobbin, the tailpiece inserted and guided during rotation in said seat.

4. Device according to claim 2, wherein the second support unit further comprises a pin integral with the housing and a hole formed axially within the cable-winding bobbin, the pin inserted and guided during rotation in said hole.

5. Device according to claim 4, wherein the second support unit further comprises a second centering bushing, arranged in the hole of the cable-winding bobbin, between the pin and the bobbin.

6. Device according to claim 2, wherein the second support unit further comprises a seat formed within the housing, a hole formed axially within the cable-winding bobbin and a pin inserted integral in the hole in the cable-winding bobbin and guided during rotation in the seat in the housing.

7. Device according to claim 2, wherein the second support unit further comprises a seat formed within the housing, a hole formed axially within the cable-winding bobbin and a pin inserted and guided in rotation in said seat and in said hole.

8. Device according to claim 7, wherein the second support unit further comprises a second centering bushing, arranged in the hole of the cable-winding bobbin, between the pin and the bobbin.

9. Device according to claim 7, wherein the second support unit further comprises a flange, arranged in the seat in the housing, between the housing and the pin.

10. Device according to claim 9, wherein the second support unit further comprises an anti-friction ring around the pin, interposed in the axial direction between the flange and the anti-friction bobbin.

11. The device according to claim 1, wherein the device comprises:
    a first operating mechanism, acting on the cable-winding bobbin to rotate it in a first angular direction,
    a second operating mechanism, acting on the cable-winding bobbin to rotate it in a second angular direction opposite the first,
    an indexer for holding said cable-winding bobbin in predetermined angular positions.

12. The device according to claim 11, wherein said first operating mechanism comprises a first actuation lever and said second operating mechanism comprises a second actuation lever.

13. The device according to claim 12, wherein said first actuation lever and said second actuation lever act to rotate said bobbin respectively according to the first and second angular directions.

14. The device according to claim 12, wherein the device further comprises a first return spring which returns said first actuation lever to a rest position after actuation and a second return spring which returns said second actuation lever to a rest position after actuation.

15. The device according to claim 11, wherein said cable-winding bobbin, said first operating mechanism, said second operating mechanism and said indexer are included in a control unit that can be separated en masse from the housing.

16. The device according to claim 15, wherein said control unit is fixed to said housing through fastening screws.

17. An actuation device for a control cable for a bicycle gearshift, comprising:
- a housing, configured to be attached to a bicycle's handlebars or frame,
- a cable-winding bobbin, angularly mobile within the housing about a main axis (X) of the device by a support of the bobbin in the housing,
- wherein said support comprises:
    - a first support unit at an outer guide collar of the cable-winding bobbin, situated in an intermediate position of the cable-winding bobbin in the direction of the main axis (X) of the device; and
    - a second support unit at an end of the cable-winding bobbin;
- wherein the second support unit comprises:
    - a seat formed within the housing and a tailpiece of the cable-winding bobbin, the tailpiece inserted and guided during rotation in said seat, and
    - a centering bushing, arranged in the seat within the housing, between the housing and the end tailpiece of the cable-winding bobbin.

* * * * *

UNITED STATES PATENT AND TRADEMARK OFFICE
CERTIFICATE OF CORRECTION

PATENT NO.         : 7,905,158 B2
APPLICATION NO.    : 11/212090
DATED              : March 15, 2011
INVENTOR(S)        : Dal Prà et al.

It is certified that error appears in the above-identified patent and that said Letters Patent is hereby corrected as shown below:

At section (75), under Inventors, in line 1, after the name "Giuseppe" delete "Dal Pra, Zane" and insert therefor --Dal Prà, Zané--.

Signed and Sealed this
Twentieth Day of November, 2012

David J. Kappos
*Director of the United States Patent and Trademark Office*